(12) United States Patent
Rastogi

(10) Patent No.: US 8,861,894 B2
(45) Date of Patent: Oct. 14, 2014

(54) METHODS AND APPARATUS FOR EDGE-AWARE PIXEL DATA GENERATION

(75) Inventor: Anubha Rastogi, Noida (IN)

(73) Assignee: Adobe Systems Incorporated, San Jose, CA (US)

( * ) Notice: Subject to any disclaimer, the term of this patent is extended or adjusted under 35 U.S.C. 154(b) by 536 days.

(21) Appl. No.: 13/118,134

(22) Filed: May 27, 2011

(65) Prior Publication Data
US 2013/0129249 A1 May 23, 2013

(51) Int. Cl.
*G06K 9/32* (2006.01)
*G06T 5/00* (2006.01)

(52) U.S. Cl.
CPC .................................... *G06T 5/00* (2013.01)
USPC ........... 382/300; 382/199; 382/254; 348/448; 348/441

(58) Field of Classification Search
CPC ....... G06T 3/4007; G06T 3/403; G06T 5/001; G06T 7/0083; G06T 2207/10016; H04N 9/45; H04N 7/012
USPC ........... 382/300, 254; 348/448, 441, 452, 458
See application file for complete search history.

(56) References Cited

U.S. PATENT DOCUMENTS

| | | | |
|---|---|---|---|
| 5,995,154 A | 11/1999 | Heimburger | |
| 7,215,375 B2 | 5/2007 | Chen et al. | |
| 7,460,734 B2 | 12/2008 | Chao | |
| 7,714,932 B2 | 5/2010 | Chen et al. | |
| 2005/0073607 A1* | 4/2005 | Ji et al. | 348/448 |
| 2009/0161017 A1 | 6/2009 | Glen | |

FOREIGN PATENT DOCUMENTS

EP 1667442 6/2006

* cited by examiner

*Primary Examiner* — Ruiping Li
(74) *Attorney, Agent, or Firm* — Wolfe-SBMC

(57) ABSTRACT

Methods and apparatus for deinterlacing an interlaced image or for upsampling an image. In one embodiment, an Edge Aware Deinterlacing system may identify edge areas and non-edge areas of an image in order to apply one interpolation method to pixels within the edge areas and a different interpolation method to pixels within the non-edge areas.

20 Claims, 7 Drawing Sheets

METHODS AND APPARATUS FOR EDGE-AWARE PIXEL DATA GENERATION

BACKGROUND

Video and other types of images are sometimes recorded, stored, or transmitted in an interlaced format. Deinterlacing techniques allow for a complete image to be rendered from image information that corresponds to less than an entire image. For the areas of an interlaced image for which there is no image information, pixel values in those areas can be determined by interpolating values from pixels for which there is image information available.

SUMMARY

In one embodiment, an Edge Aware Deinterlacing (EAD) system may generate a new row of pixels between an existing upper row of pixels and an existing lower row of pixels within the image. In another embodiment, the EAD system generates a new row of pixels between two existing rows of pixels in order to upsample the image. In either case, the generation of the new row includes assigning pixel values for the pixels of the new row. The generation of the new row includes segmenting the upper and lower rows into one or more segments of pixels. The segmenting involves identifying pixels of a similar color within the upper and lower rows. The one or more segments are used by a segment interpolation method to generate a pixel value for a segment pixel position within the new row. The segment interpolation method is based on color values of at least two of the pixels within the segment of pixels. The generation of the new row also includes determining an edge within the image at an edge pixel position, where the edge pixel position is not within the one or more segments. For the edge pixel position, a pixel value may be generated according to an edge interpolation method based on color values of at least two or more pixels of the upper and lower rows along the edge.

While the invention is described herein by way of example for several embodiments and illustrative drawings, those skilled in the art will recognize that the invention is not limited to the embodiments or drawings described. It should be understood that the drawings and detailed description are not intended to limit the invention to the particular forms disclosed, but on the contrary, the intention is to cover all modifications, equivalents and alternatives falling within the spirit and scope of the present invention. The headings used are for organizational purposes only and are not meant to be used to limit the scope of the description. As used throughout this application, the word "may" is used in a permissive sense (meaning "having the potential to"), rather than the mandatory sense (meaning "must"). Similarly, the words "include", "including", and "includes" mean "including, but not limited to."

DETAILED DESCRIPTION OF EMBODIMENTS

Various embodiments of methods and apparatus are provided for deinterlacing an interlaced image. Embodiments of an Edge Aware Deinterlacing (EAD) system may identify edge areas and non-edge areas of an interlaced image in order to apply one interpolation method to pixels within the edge areas and a different interpolation method to pixels within the non-edge areas. Embodiments of the EAD system may also be used to upsample images by creating new rows within the images and applying the EAD system generate pixel values for pixel positions within the new row.

In one embodiment, the EAD system may be implemented by a computing module within a video player or a television. However, the EAD system may be implemented within any device capable of rendering an image or any device that ultimately provides image information to a device capable of rendering an image.

In the following detailed description, numerous details are set forth to provide a thorough understanding of claimed subject matter. However, it will be understood by those skilled in the art that the claimed subject matter may be practiced without these specific details. In other instances, methods, apparatuses or systems that would be known by one of ordinary skill have not been described in detail so as not to obscure claimed subject matter.

Figure 1:
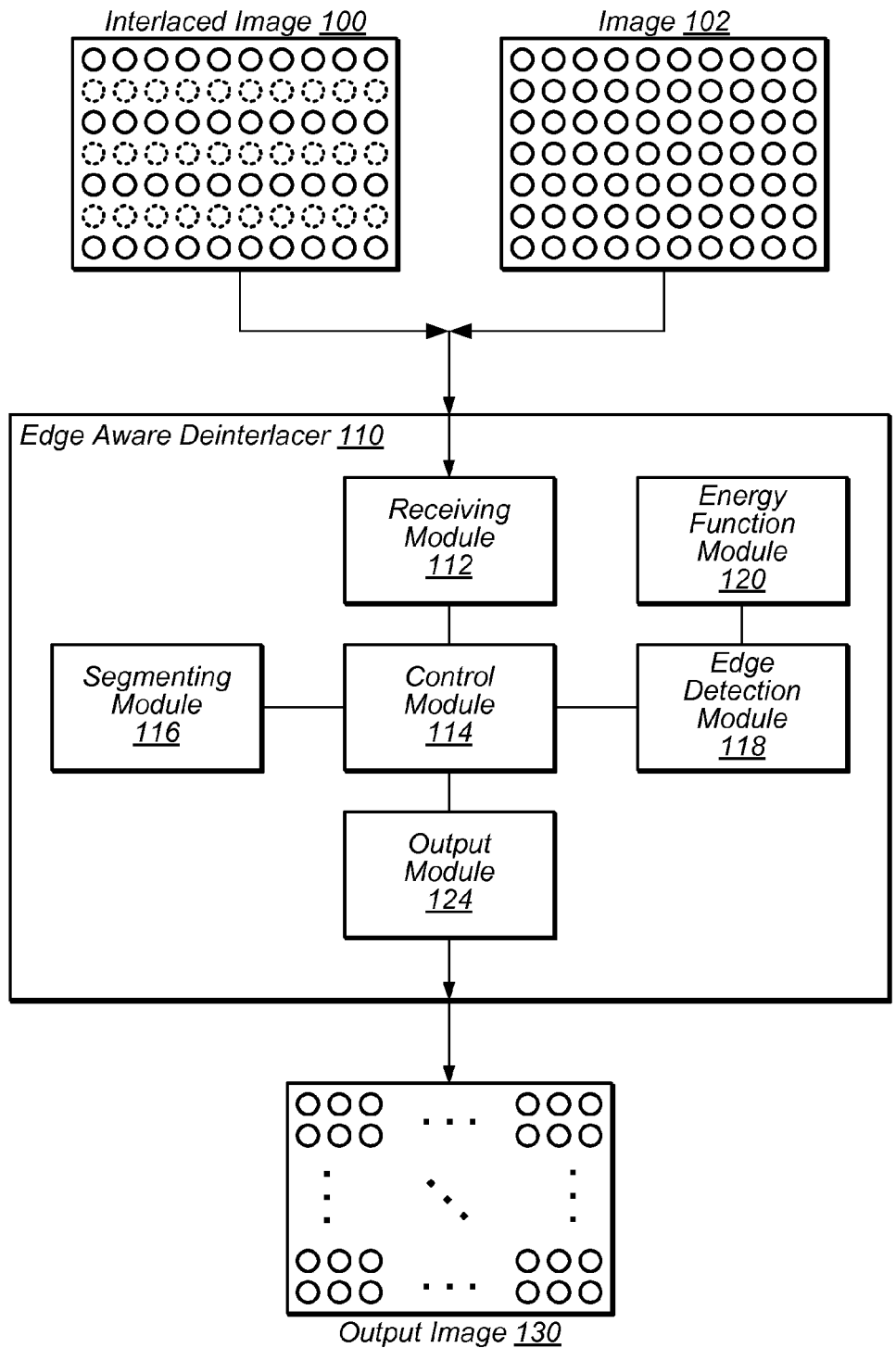
FIG. 1 illustrates a module that may implement an EAD system, according to some embodiments.

Below are example methods and apparatus provided for deinterlacing an interlaced image according to embodiments of the EAD system. As depicted in FIG. 1, the EAD system may receive an interlaced image or images. An example interlacing technique results in an image where pixel information is absent from every other row of the image, such that the vertical resolution is reduced by half. The EAD system may then process the image or images and output a deinterlaced image or images. In the case of deinterlacing video, the EAD system will repeatedly process still images to produce a deinterlaced video stream.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing", "computing", "calculating", "determining", or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Example Embodiment: Edge Aware Deinterlacer

FIG. 1 illustrates one embodiment of the EAD system that may take form in an Edge Aware Deinterlacing module. The EAD module may include a receiving module 112 for receiving an interlaced image, or in the case of video, a series of interlaced images. In the case that the EAD system is used to upsample an image, the EAD module may also receive a complete image and produce an upsampled image as output. The receiving module 112 may be coupled to a control module 114, that is in turn coupled to a segmenting module 116. The control module 114 may also be coupled to an edge detection module 118 which may process the pixels not determined to be part of a segment by the segmenting module. The edge detection module may be coupled to an energy function module 120, which may perform the calculations for identifying an edge, including a horizontal edge. The control module 114 may also be coupled to an output module 124 that may transmit a deinterlaced version of the image or images received by the receiving module 112. Each of the modules within the EAD module may be implemented by program instructions stored in a computer-readable storage medium and executable by one or more processors. Other embodiments of the modules within the EAD module may be at least partially implemented by hardware circuitry or firmware within one or more processors.

As depicted in FIG. 1, in one embodiment, the EAD system may operate on an interlaced image. In this embodiment, each missing row, referred to in each processing instance as a center row, may be assigned pixel values for each pixel position of the center row using pixel color information from pixels in the row below and the row above the center row.

In this embodiment, the EAD system receives an image or a frame of video in some kind of interlaced format. While the examples within this specification refer to an interlaced format with an image missing every other row of pixel information, any interlacing format may be received by the EAD system.

The generation of pixel values for pixel positions in any given center row of the received image may be done by checking if a pixel position lies along an edge or not. To generate pixel values for the edge and non-edge pixel positions, a two part approach may be used. One part of the EAD process identifies segments that are areas of pixels not containing edges. A segment is considered to be a group of pixels from the row above and below the center row with colors that are similar. For example, in an image of a blue box against a white background, the areas of blue within the box may be considered a segment. In this example, at the point that the blue pixels meet the white pixels, the segment ends. Each of the pixel positions within the area of a segment is assigned pixel values using a segment interpolation method specific to non-edges.

Once the pixel positions of the center row that have been determined to be part of segments and assigned pixel values according to a segment interpolation method, the remaining pixel positions of the center row are processed to determine whether the pixel positions lie along an edge. If the EAD process determines that a pixel position lies along an edge, the pixel position along that edge may be assigned pixel values according to an edge interpolation method. In this embodiment, the edge interpolation method and segment interpolation method perform different calculations to arrive at a pixel value.

As depicted in FIG. 1, the image or frame of video is received by an Edge Aware Deinterlacer module, and after processing, the deinterlaced result is transmitted as output.

Example Embodiment: Assigning Pixel Values to a Single Missing Row

Figure 2:
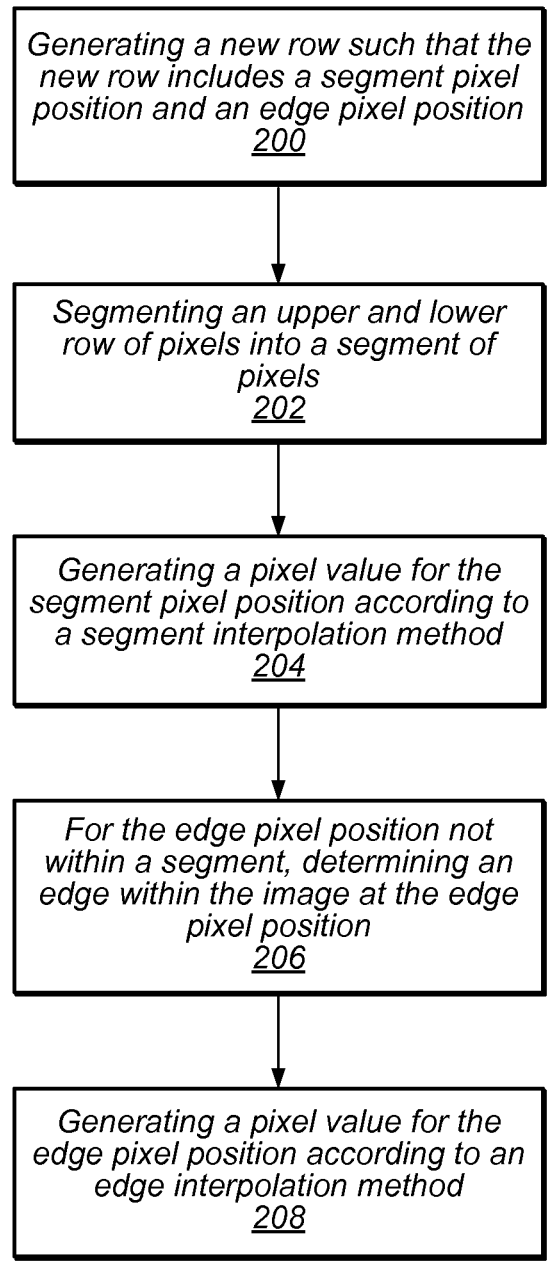
FIG. 2 depicts a flowchart of certain processing steps of an embodiment of the EAD system.

FIG. 2 illustrates a high level overview of the EAD system as applied to a single missing row of pixel positions within an interlaced image. In this embodiment, the single missing row, is referred to as a center row because it lies between an upper row of existing pixels and a lower row of existing pixels. In other words, with respect to a center row for which pixel values may be generated, there is an upper row and a lower row of pixels from which to draw interpolation information.

FIG. 2 is a flow chart depicting functionality of an embodiment of the EAD system that begins by generating a new row to which the EAD process may apply, as in step 200. As noted earlier, for the purposes of computation, each missing row may be considered the center row where the rows above and below the center row are rows of pixels with existing color values.

Step 202 of FIG. 2 corresponds to segmenting pixels from the row above and the row below the center row to identify pixels with similar color values. Beginning with a first pixel from the upper or lower row, a pixel is selected as the first pixel of a potential segment. To begin with, the first pixel selected is considered a segment and an average color value for the segment may be set to the color values of the first pixel.

In this embodiment, adjacent pixels from the upper and lower rows are considered until a pixel of a sufficiently different color is encountered. At this point, the segmenting process may stop adding pixels to the segment, and the segment may be considered defined, or allowed. A more detailed example of the segmenting process is described below with respect to FIG. 4.

For each segment, there may be some pixel positions from the center row of pixel positions that are determined to be within the segment and therefore may be assigned pixel values according to color values for the segment. Examples for how the segment pixel positions may be mapped to segment pixels to determine pixel values are presented in the discussions for FIGS. 6 and 7.

Once the center row pixel positions within the segment have been mapped and assigned according to a segment interpolation method, as reflected in step 204, the EAD system may calculate interpolation values for the pixel positions not included within any identified segments. Further details of example segment interpolation methods are discussed below with respect to FIG. 4. The pixel positions not included in any segments may be considered as pixel positions along a possible edge within the upper and lower rows of the image.

The determination of an edge along the upper and lower rows is reflected by step 206 of FIG. 2. As noted above, FIG. 5 presents additional details of an embodiment of a method to determine whether or not a pixel position in the center row, not within a segment, lies along an edge. In this example, this edge determination step is reflected within step 206.

Once the edge has been determined by the EAD system, the center row pixel position along the edge may be assigned pixel values based on the upper row pixel and lower row pixel along the edge, as reflected in step 208 of FIG. 2. Further details of example edge interpolation methods are discussed below with respect to FIG. 5.

After each center row pixel position within a segment and each center row pixel position outside of a segment has been processed by the EAD system, the center row pixel positions may be considered defined according to one interpolation method for the segment pixel positions and another interpolation method for the non-segment pixel positions. At this point, one entire row of the interlaced image will have been created.

Figure 3:
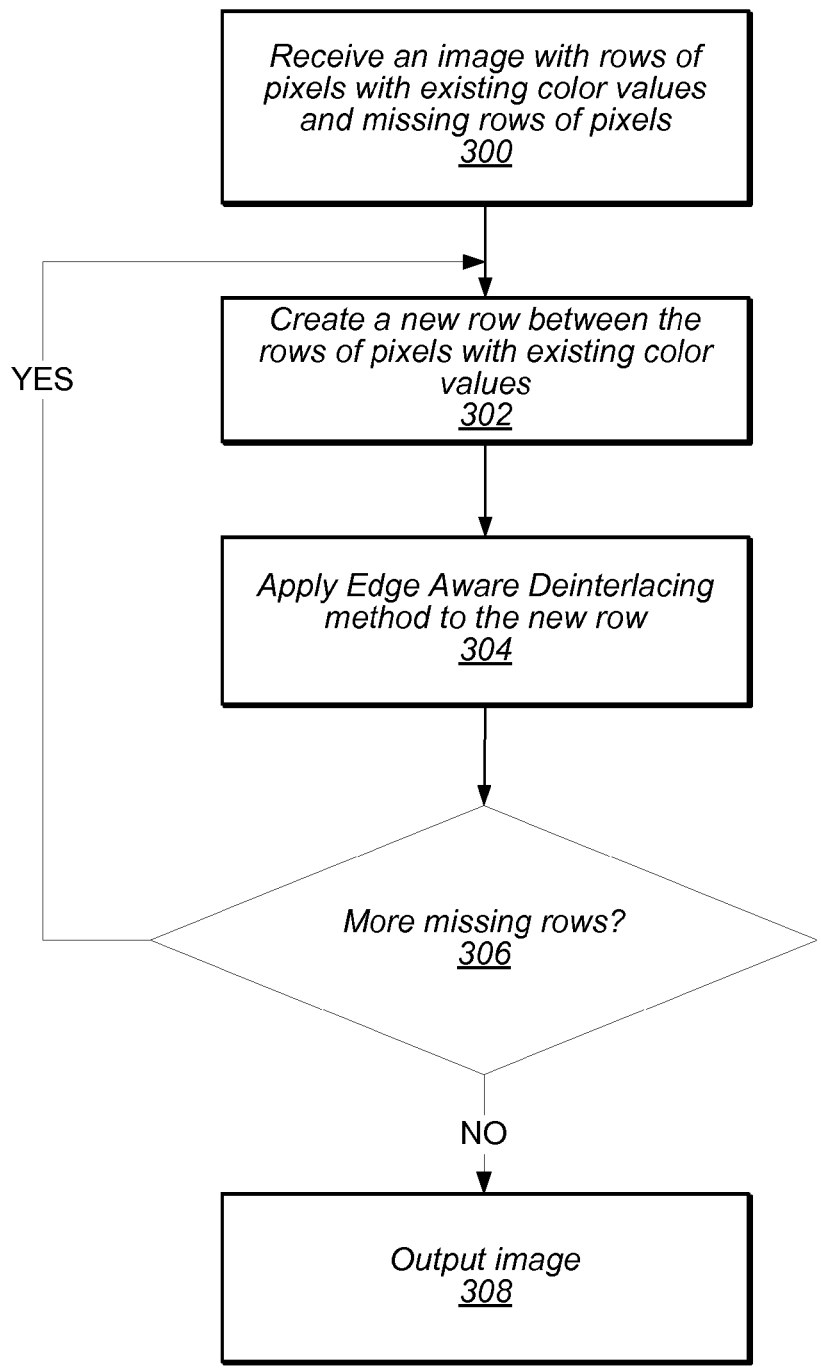
FIG. 3 depicts a flowchart of a certain processing steps related to receiving an interlaced image and outputting a deinterlaced image, according to some embodiments.

This high level description of the EAD system illustrated in FIG. 2 may be considered the process step 304 of FIG. 3, which presents an overview of how an entire image may be received and processed. The segmenting process step 202 is further described within FIG. 4, and the edge determination step 206 is further described in FIG. 5.

Example Embodiment: Deinterlacing an Entire Image

FIG. 3 illustrates an embodiment of how the generation of pixel values for a single row as outlined by FIG. 2, fits into the overall scheme of deinterlacing an entire image. As described above, an embodiment of the EAD method begins when an image is received, as reflected in step 300.

For each missing row in the interlaced image, the EAD system may successively create a new row of pixel values between existing pixel rows of the image, as reflected in step 302. For each new row to be created, the EAD method as described above with respect to FIG. 2, may be applied, as reflected in step 304.

Until a new row has been created between each existing row of pixels, the

EAD system may repeat by creating a new row, otherwise, the EAD process may complete since all rows have been created. This decision step is reflected by step 306.

Upon completion of the deinterlacing according to the EAD method, the entire deinterlaced image is produced as output, as reflected in step 308. While the process depicted in FIG. 3 illustrates an embodiment where each row is created serially, the EAS system may also apply in a parallel system where each row is created in parallel. In such a parallel system, an example embodiment would assign the creation of each new row to a given processor of a parallel system. This parallelism is possible in part because there is no dependency between the creation of rows within the image.

Alternatively, instead of outputting an entire image, the output may include each portion of the interlaced image as it is processed. Similarly, the input received by the EAD system may be portions of the image sufficient to serve as input to the EAD system, which in this embodiment would be three rows, a center row of pixel positions without pixel values, and a row above and below the center row.

Example Embodiment: Creating a Segment

Figure 4:
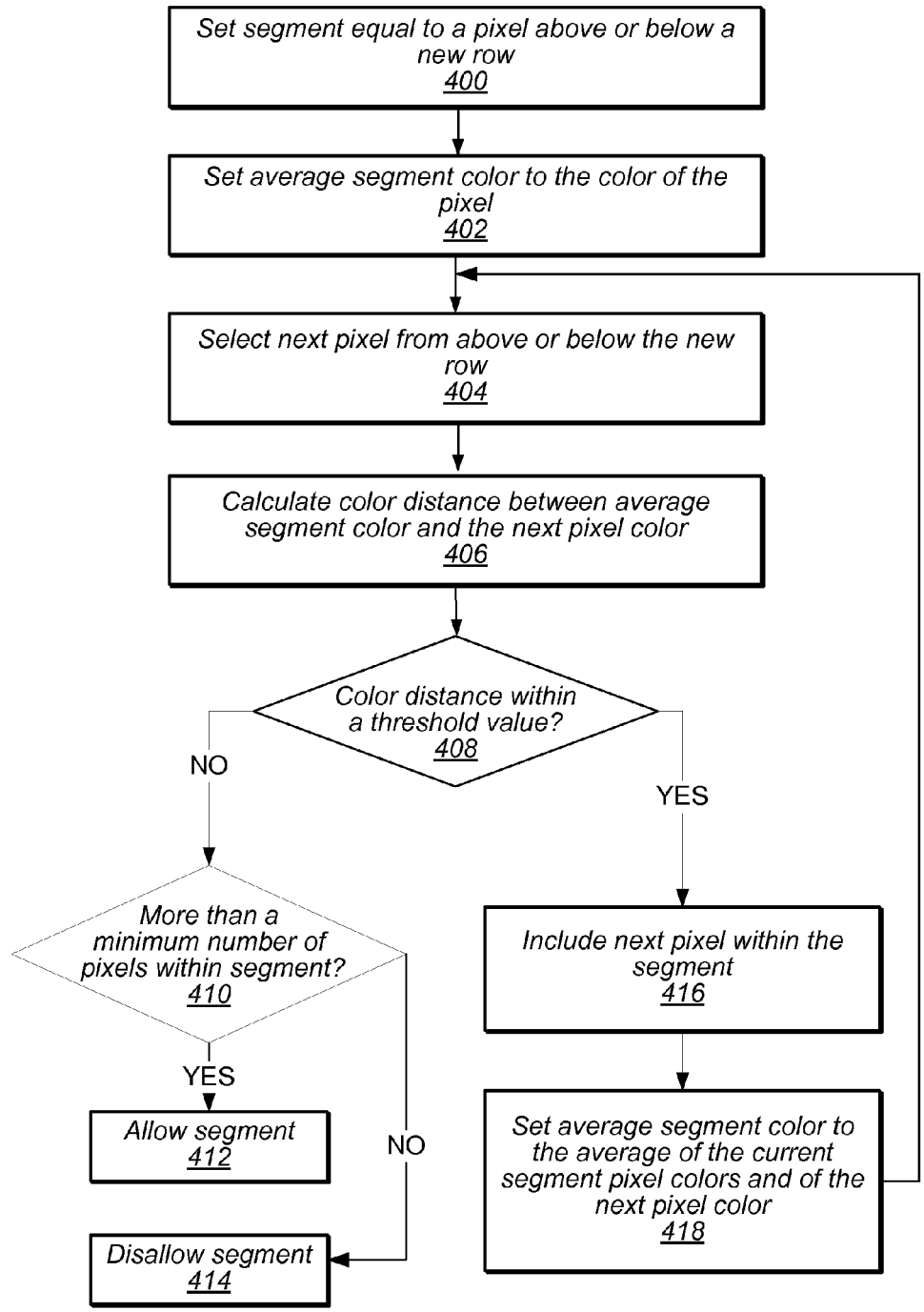
FIG. 4 depicts a flowchart of certain processing steps related to segmenting pixels, according to some embodiments.

FIG. 4 depicts portions of a method for determining segments, according to some embodiments. As noted above with respect to FIG. 2, segmenting the interlaced image is used to determine the pixel positions of a new row on which to apply a segment interpolation method for assigning color values.

A segment, generally, may be considered to be an area of an image where the pixels are similar in color. In this example, as reflected in step 400, a potential segment begins by selecting a single pixel from above or below the new row for which we are determining color values. For the purposes of processing, each new row is referred to as a center row. At this initial step, the segment is considered to be the first pixel and the segment's average color is that of the first pixel, as reflected in step 402.

At this point, as reflected in step 404, when the segment is initially considered to be the first pixel, the EAD system selects a next pixel for consideration for inclusion within the segment. Adjacent pixels may be considered until a pixel is considered that lies outside a threshold used to determine color similarity. In one embodiment, the EAD system may calculate a color distance between color values to determine similarity, as reflected in step 406.

Figure 6:
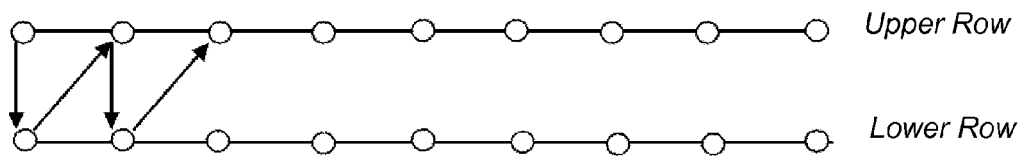
FIG. 6 illustrates a method in which a segment may be processed, according to some embodiments.

An example of the pattern in which pixels are processed is depicted in FIG. 6, which presents a zigzag pattern in which the pixels of the upper row and lower row are processed. Not shown in FIG. 6 is the center row of pixel positions between the upper and lower rows. Other embodiments may begin with different pixels and may consider adjacent pixels according to different patterns.

One example for performing a color distance calculation may be first scaling the color values. Once the values have been scaled, for example to values between zero and one, the values can be used to calculate a color distance. In this example, color values are represented by three components, a red value, a green value, and a blue value. However, in different embodiments, colors and color values may be represented in other ways, and other formulas may be used for determining color similarity.

In the initial case, an example color distance formula takes the square root of the sum of three values, where the first value is the square of the difference between the red value of the first pixel and the red value of the next pixel, where the second value is the square of the difference between the green values of the first pixel and the next pixel, and where the third value is the square of the difference between the red values of the first pixel and the next pixel. In subsequent calculations, and generally, the color distance is calculated using the average color values of the segment and the color values of the next pixel.

At this point, the segment is only considered to be the first pixel, and a next pixel is being considered for inclusion into the segment. Once the color distance between the first pixel and the next pixel has been calculated, a determination may be made of whether the color distance lies within a threshold value of the average color of the segment, as reflected in step 408.

As noted, at the beginning, the average color values for the segment may be the color values of the first pixel. The threshold value may be varied to adjust the sensitivity with which pixels are considered part of a segment or part of an edge. In some embodiments, the threshold values may be adjusted by user input.

In one embodiment, a threshold value may be based on the average color of the segment. For example, if the average color of a segment is greater than 0.2, after scaling to values between 0 and 1, then the threshold value may be set to 0.1. In this example, if the average color of the segment is not greater than 0.2, after scaling, then the threshold value may be set to 0.05. In other cases, the threshold value may be scaled based on the ranges of color values possible. In different embodiments, the threshold value may automatically be set to be a higher value when the average color is nearer the high end of the color range and to a lower value when the average color is nearer the low end of the average color range.

As reflected by step 410, when a pixel in the upper or lower rows is considered and the color value of the pixel is determined to lie outside the threshold value, the segment will stop growing. At this point, the segment may include a set of pixels in the upper row and a set of pixels in the lower row, and a determination may be made on whether the quantity of pixels in the segment satisfy a minimum number of pixels to be considered a segment. The minimum number of pixels in a segment may vary in different embodiments, however, in this example, a minimum of three pixels is used.

If decision step 410 determines that the segment satisfies the minimum number of pixels necessary to create a segment, the segment is considered defined, or allowed, as reflected in step 412. Once a segment is allowed, the segmenting process may repeat beginning at step 400 until all pixels of the upper and lower rows have been considered.

If the minimum number of pixels is not met, the segment is disallowed, as reflected in step 414. If the segment is disallowed, the component pixels may be used by the edge determination process, described below with respect to FIG. 5. The segmenting process may repeat beginning at step 400 until all pixels of the upper and lower rows have been considered.

If the decision step 408 determines that the next pixel is within the threshold range for determining color similarity, then the next pixel is included within the segment, as reflected in step 416. Upon the determination to include the next pixel, the color characteristics of the segment may be adjusted, as reflected in step 418. In one embodiment, the average color of the segment may be recalculated after each additional pixel is added to the existing segment. In this example, the next pixel is included within the segment and a new segment color average is calculated, where the average is based on all the pixel values of the segment before the next pixel addition and the color values of the next pixel. In other embodiments, the average color of the segment would be set to an average of the color values for the next pixel and the color values for the current average of the segment before including the next pixel. In other embodiments, the color characteristics of the segment may be set to be the color values of the most recently added pixel, which would be updated after each pixel is added to the segment.

Upon adjustment of the color characteristics of segment, the process continues by selecting another next pixel until a pixel is considered that falls outside the threshold for determining color similarity or until the end of the new row is reached. This iterative step is reflected by control flowing from the adjustment step 418 to the selection of the next pixel step 404.

Upon definition, pixels in a segment may be used to select center row pixel positions on which to apply a segment interpolation method. Center row pixel values may be generated as each segment is defined, or the center row pixel values may be generated after all segments have been defined, or the center row pixel values may be generated at some point in between. Below are example methods for associating the center row pixel positions with a segment.

Example Embodiment: Associating Center Row Pixel Positions with a Segment

Once a segment is determined, as described above with respect to the discussion related to FIG. 4, the segment pixels of the upper and lower row may serve as the basis for calculating pixel values for pixel positions of the center row. Given pixels from the segment from the upper row and lower row, pixel positions from the center row may be determined to be encompassed by the segment and therefore may be assigned color values based on the segment and according to a segment interpolation method.

Various embodiments of the EAD system may use different methods for determining which pixel positions of the center row may be considered part of the segment and also for determining which pixels of the segment to use as the basis for calculating interpolation values for the center pixel positions. Similarly, in different embodiments of the EAD system, different segment interpolation methods may be applied.

Given a segment with pixels along an upper row and pixels along a lower row, the center row of pixel positions that lay within an area near and within an outline defined by the upper row and lower row of pixels may be considered to be part of the segment, in this example. These center row pixel positions may then be assigned pixel values using a segment interpolation method based on color values of the pixels within the segment.

One example for calculating a segment interpolation value for a center row pixel position is to map one pixel from the upper row and one pixel from the lower row to the pixel position in the center row. Each remaining pixel position of the center row considered part of the segment may then be mapped similarly. The center row pixel position may then be assigned an interpolation value that is the mean of the red, green, and blue (RGB) values of the upper row pixel and the lower row pixel. Other methods of calculating the interpolation value are available, and the calculation may also depend on the manner in which colors of the pixel are represented. RGB values are simply one of several methods in which pixel colors may be represented.

The mapping of the pixel positions in the center row to pixels in the upper and lower rows may be accomplished in several ways. In one example, applicable to the case when the outline formed by the upper and lower pixels is a perfect rectangle of pixels, or does not extend beyond a perfect rectangle by more than one pixel in the upper row or lower row, each center row pixel position is mapped to the pixel directly above and directly below the given center row pixel position.

Figure 7:
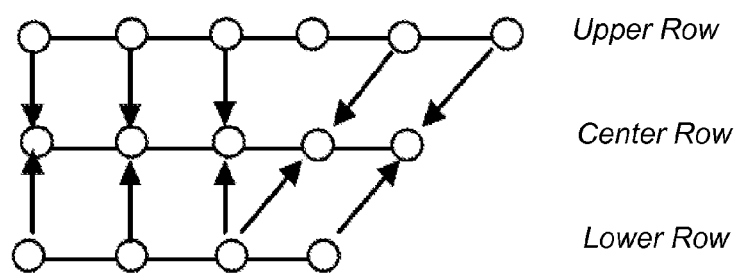
FIG. 7 illustrates a mapping method of upper and lower row pixels to center row pixel positions within a segment, according to some embodiments.

In the example depicted in FIG. 7, the segment is made up of six pixels from the upper row and four pixels from the lower row, and five pixels from the center row are determined to be encompassed by the area near and within an outline formed by the upper and lower rows of pixels. As depicted, for the center row pixel positions at the rightmost end, there is no pixel directly below, and in this case the center pixel position may be mapped to the upper row pixel at the end nearest the center row pixel position and to the lower row pixel at the end nearest the center row pixel position.

Given the segment in FIG. 7, other mappings of the center row pixel positions to upper and lower row pixels are possible. A formulaic mapping of pixel positions in the center row to pixels in the upper and lower row may be more computationally efficient if the outline of the segment has an irregular shape. In FIG. 7, the pixels in the upper row part of the segment extend two pixels beyond a perfect rectangle. The arrows indicate a mapping that may be determined for each center row pixel position to an upper row pixel and a lower row pixel.

In this case, with non-rectangular shaped segment, a mapping function may be introduced to map the center row pixel position to a pixel above and a pixel below. One example of such a mapping function may be that for a center row pixel position at position x, $C_x$, the upper row pixel mapped may be $U_a+((C_x-C_a)*(U_b-U_a))/(C_b-C_a)$, where $U_a$ is the first pixel in the upper row, $C_x$ is the center pixel position, $C_a$ is the first pixel position of the center row, $U_b$ is the last pixel of the upper row, and $C_b$ is the last pixel position of the center row. The formula for mapping a center row pixel position to a lower row pixel may be defined similarly as $L_a+((C_x-C_a)*(L_b-L_a))/(C_b-C_a)$. Applying this mapping function produces a mapping corresponding to the two arrows pointing in toward each given center row pixel position, one from the upper row and one from the lower row, as depicted within FIG. 6.

Once the center row pixel positions have been mapped to pixels within the segment and assigned segment interpolation values, the EAD system may then calculate interpolation values for the pixel positions not included within any identified segments. Given identified segments, the EAD system may determine whether pixel positions of the center row not included in any segments may be considered to lay along an edge. The determination of an edge within the upper and lower rows is discussed below with respect to FIG. 5.

Example Embodiment: Determining an Edge

Figure 5:
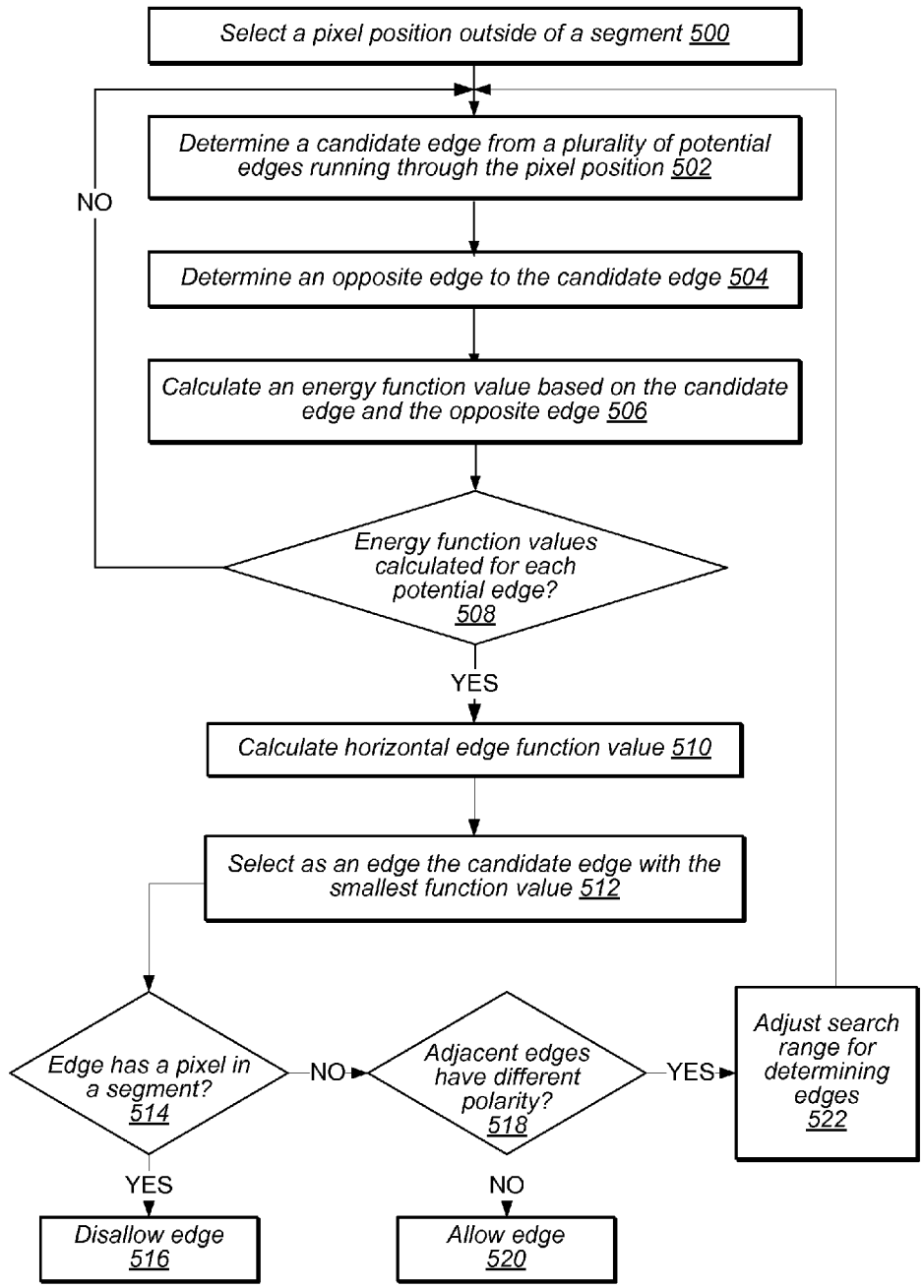
FIG. 5 depicts a flowchart of certain processing steps related to determining edges within an image, according to some embodiments.

FIG. 5 depicts portions of a method for determining edges, according to some embodiments. As noted above with respect to FIG. 2, determining edges within an image is used to determine which pixel positions of a new row on which to apply an edge interpolation method for assigning color values.

For each of the pixel positions of the center row not assigned interpolation values based on a segment interpolation method in accord with the process described above with respect to FIG. 4, the EAD system may determine if the remaining center row pixel positions lay along an edge. This initial step is reflected in step 500.

In this example, an edge may be formed by an upper pixel, a center row pixel position, and lower row pixel. Three such pixels, when determined and considered together as an edge, may serve as the basis from which to calculate an interpolation value for the edge pixel position in the center row. The line formed by connecting each of the three pixels may be considered to be an edge.

An edge may be determined in several different manners, and once the edge pixels are determined, the center edge pixel position can be assigned interpolation values according to an edge interpolation method. The assignment of interpolation values to the center edge pixel position may be based on the color values for a pixel along the edge in the upper row and a pixel along the edge in the lower row. For example, the color values for the center edge pixel position may be assigned to be the median of the color values of the edge pixel in the upper row and the edge pixel in the lower row. However, this example is only one way to calculate an interpolation value for the center edge pixel position given the upper and lower edge pixels.

The EAD system may use a combination of calculations and special cases to determine which pixel from the upper row and which pixel from the lower row may form the edge that includes a given center row pixel position. As part of the calculation steps to determine which upper pixel and lower pixel form the edge used to calculate an edge interpolation value, the EAD system may use energy functions.

Figure 8:
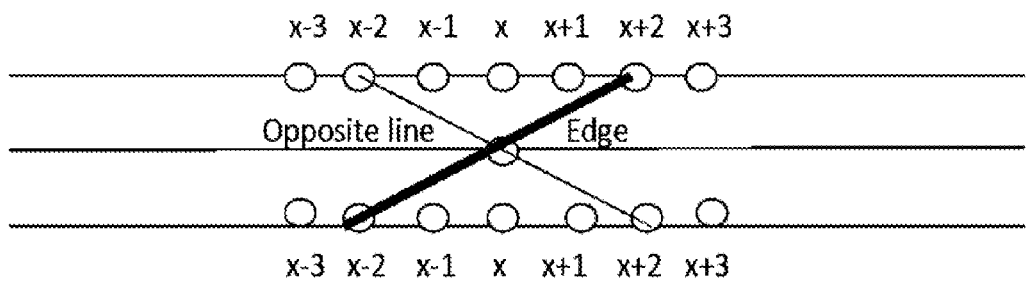
FIG. 8 illustrates a candidate edge and the pixels making up the candidate edge, along with an opposite line edge and the pixels making up the opposite edge, according to some embodiments.

In the EAD system, and in the case of a non-horizontal edge, pixels on an edge should have colors that are similar. An edge can further be characterized as having a slope, where the slope is determined by the position of edge pixel in the upper row and the edge pixel in the lower row. For example, as depicted in FIG. 8, for a center row pixel position at position C, an upper row pixel at position $U_{x+2}$, and a lower row pixel at position $L_{x-2}$, the slope of the edge will be ⅔, or ½. In this example, the edge includes a center row pixel position at position x, a lower row pixel at position x−2, and an upper row pixel at position x+2.

In the EAD system, in the case of a non-horizontal edge, pixels on an edge with a slope negative of that of an edge should have colors that are highly dissimilar. Continuing with this example, the opposite edge may be made up of the same center row pixel position at position $C_x$, an upper row pixel at position $U_{x-2}$, and a lower row pixel at position $L_{x+2}$, and the slope of the opposite edge will be −⅔, or −½. As depicted in FIG. 8, the opposite edge line can be seen as contrasted to the edge line.

In the EAD system, if the set of pixels ($U_{x+2}$, $C_x$, $L_{x-2}$) form a non-horizontal edge, then the vertical image gradient between pixels $U_{x+2}$ and $L_{x-2}$ should be small. Given these three characteristics of an edge, color similarity along an edge, color dissimilarity along an opposite edge, and vertical image gradient values, the EAD system makes use of an energy function to calculate which pixel in the upper row and which pixel in the lower row may determine the edge.

An example energy function may be defined as:

$$E(d) = \frac{C(d)*V(d)}{C(-d)}.$$

Where d is the edge direction corresponding to pixels ($U_{x+2}$, $C_x$, $L_{x-2}$), C(d) is a color distance function, V(d) is a vertical gradient function, and C(−d) is the color function as applied to an opposite edge of d. Considering only a few pixels on either side of the center row pixel position, a number of different possible edges may be fed into the energy function. In a case where a range of four pixels to the left and four pixels to the right of the center row pixel position are considered, the edge corresponding to pixels ($U_{x+2}$, $C_x$, $L_{x-2}$) is but one possible edge. Other embodiments of energy functions may introduce scalar values, or may use different functions with which to compare the color values of the pixels.

Further, the set of pixels considered an edge and opposite edge may not necessarily be symmetric. For example, the set of pixels ($U_{x+2}$, $C_x$, $L_{x-3}$) may also be considered an edge within the range of pixels being considered. In this case, a primary factor is that the sampling of edges selected for calculation of energy function values be representative of the various slopes possible within the range of pixels considered.

In one embodiment, the EAD system may consider only a subset of all the possible edges within a range of pixels. For the purposes of computation, in this example, four pixels to the left and right of a center row pixel position may be considered the range of pixels. However, there are several alternative ways in which the EAD system could select potential ranges to consider, and in some cases the range may be bounded by the proximity of a segment or segments.

In this example, the EAD system may consider nine of the possible edges within the set of pixels within the range of four on either side of the center row pixel position. Determining the first possible edge is reflected in step 502, determining the opposite edge is reflected in step 504, and calculating the associated energy function is reflected in step 506. In some embodiments, if any edge includes a pixel that is also within an segment, it may not be considered as an edge and another possible edge may be considered in its place.

Overall, an energy function value may be calculated for each of these nine edge candidates. The edge candidate with the lowest energy function value may be considered the strongest candidate from this phase of the process. Step 508 reflects the point at which the iterative calculations have been completed or not. If all edge candidates have been processed, the next step is to consider the special case of a horizontal edge, as in step 510.

In addition to calculating the energy function values for various potential edge candidates above, the EAD system may also consider the special case of a horizontal edge, as in step 510. Horizontal edges may sometimes be found within images containing text or buildings, for example. In the case of a perfectly horizontal edge, none of the edge directions considered above in calculating the energy functions would satisfy the assumptions regarding characteristics of edges used by the energy function in determining an edge. In other words, in a horizontal edge, pixels in the upper row will have a similar color and the pixels in the lower row will also have a similar color, but pixels along an edge drawn between a pixel in the lower row and a pixel in the upper row will not have a similar color.

Therefore, to detect the case of a horizontal edge, an additional calculation may be performed to identify this special case. In this example, with respect to the center pixel position $C_x$, an energy function may be defined to be a color difference calculation between two means, the mean of and $U_{x-1}$ and $L_{x-1}$ and the mean of $U_{x+1}$ and $L_{x+1}$, where $U_{x-1}$ is the upper row pixel to the left of the center row pixel position, $L_{x-1}$ is the lower row pixel to the left of the center row pixel position, $U_{x+1}$ is the upper row pixel to the right of the center row pixel position, and $L_{x+1}$ is the lower row pixel to the right of the center row pixel position. In other embodiments, the horizontal energy function may also select other pixels from the upper and lower rows on which to base the energy function.

At this point, energy function values have been calculated for several different edge directions and for the horizontal edge special case. If the energy function value of the horizontal edge calculation yields an energy value smaller than that of any other direction, then the horizontal edge is determined to be the current edge candidate. If one of the other edge candidates considered corresponds to the lowest energy value, that edge may be considered the current edge candidate, as reflected in step 512.

In some embodiments, the determination of an edge may conclude with processing the current edge candidate as an edge and applying the edge interpolation method to generate pixel values for the center row pixel position along the current edge candidate. In other embodiments, additional processing steps may be performed to further increase confidence in the determination of the current edge candidate as an edge within the image. These additional edge detection enhancements are described below.

Whether or not the additional edge detection enhancement calculations are performed, ultimately, when an edge is finally determined, it may be either a standard edge or a horizontal edge. The pixels from the upper and lower rows selected on which to base interpolation values depends on the type of edge determined.

In the case of a horizontal edge, the center row pixel position may be assigned pixel values according to an edge interpolation method based on an interpolation using the pixel directly above and the pixel directly below the center row pixel position. However, since the edge is horizontal, the center row pixel position can also be assigned interpolation values based on other pixels in the upper row and lower row.

In the case of a standard edge, the center row pixel position may be assigned pixel values according to an edge interpolation method based on an interpolation using the pixels along the edge from the upper and lower rows. Among various interpolation functions available, one may be to assign to the center row pixel position an average of the color values of the upper and lower pixels along the edge.

Example Embodiment: Edge Detection Enhancements

At the point that the first additional processing steps are performed, the EAD system has identified a current edge candidate. Given a current edge candidate produced by step 512 in FIG. 5, additional processing steps may finally decide whether the current edge candidate may be considered to be an edge or not. These additional steps are reflected in steps 514-522.

One of the additional processing steps, reflected in step 514, determines whether the current edge candidate includes a pixel that is also within a segment. If either the lower row pixel or upper row pixel making up the current edge candidate is within a segment, the edge is disallowed, and the edge is no longer considered as an edge, as reflected in step 516. In one embodiment, upon an edge being disallowed, the edge pixel position may be processed as a segment pixel position and assigned pixel values according to a segment interpolation method. In another embodiment, the edge determination process may begin anew at step 500 with the restriction that the current edge candidate not be considered as a candidate edge. In this embodiment, a result may be that the edge corresponding to the energy function value next lowest to the disallowed edge may be considered the next edge candidate. However, given a new edge being considered among the edge candidate, a new edge entirely may be considered the next candidate edge. Alternatively, instead of beginning the edge determination process anew, processing may continue directly by assigning the edge with the next lowest energy function value to be the current edge candidate, and processing may continue at step 514 with the new current edge candidate.

If the EAD system determines that the current edge candidate does not overlap a segment, next may be a determination of whether the current edge candidate is adjacent to an edge with an opposite slope polarity, as reflected in step 518. In this case, the current edge candidate includes an edge pixel position within the center row. If another edge candidate including a second edge pixel position, where the second edge pixel position is adjacent to the edge pixel position, and the other edge candidate has an opposite slope polarity, then the EAD system may adjust the search range for potential edge candidates, as reflected in step 522, and begin a new search for an edge candidate starting at step 502.

In other embodiments, the current edge candidate may not be abandoned unless the slope of the edge candidate including the second edge pixel position is itself adjacent to a third edge pixel position with an edge candidate with an opposite slope. In this case, when the slopes of the edge candidates change more than twice, the search range may be adjusted and the process for finding an edge may begin again at step 502.

If the EAD system determines that the current edge candidate does not overlap a segment, and the current edge candidate is not adjacent to edges with opposite polarity, the current edge candidate may be allowed to be, or determined to be an edge, as reflected in step 520.

In other embodiments, only one of the two additional processing steps described may be applied. Further, the relative order of this processing step and the earlier processing step, reflected in step 514, are not relevant and the order may be reversed.

At the point when the current edge candidate is determined to be an edge, the edge interpolation method may be applied to generate pixel values for the center row edge pixel position. An example edge interpolation method is described above with respect to step 512, and may depend on whether the current edge candidate is a horizontal edge or a standard edge.

Example Embodiment: Upsampling

As noted above, the EAD system may be used to create a new row of pixels with pixels values based on rows above and below the new row. In this manner, the EAD system may deinterlace an image. However, the functionality of the EAD system applies equally to upsampling an image that is not interlaced, thereby doubling the image height and width.

The interlaced images discussed above were only missing rows of pixels, and so only rows were created and added. However, to upsample a non-interlaced image, both rows and columns of pixels are created and added. To create the new rows, the process as described above with respect to FIG. 2 may be applied. The application of the EAD process to the rows of the image essentially doubles the height of the image. To complete the upsampling process, the width of the image should also be doubled. Doubling the width may be accomplished in two different manners.

In a first embodiment, the EAD process may be applied to columns instead of rows. Each of the process steps described above with respect to rows may similarly be applied to columns, with a left column substituting as a bottom row, a right column substituting as an upper row, and a center column substituting as a center row. After application of the EAD process to the columns of the image, the upsampled image contains double the rows and columns of the original image.

In another embodiment, after applying the EAD system to create new rows, the image may be rotated 90 degrees and the EAD system may be applied again to again create new rows. After rotating the image 90 degrees in the opposite direction, the upsampled image is in its original orientation with double the rows and columns of the original image.

Example System

Figure 9:
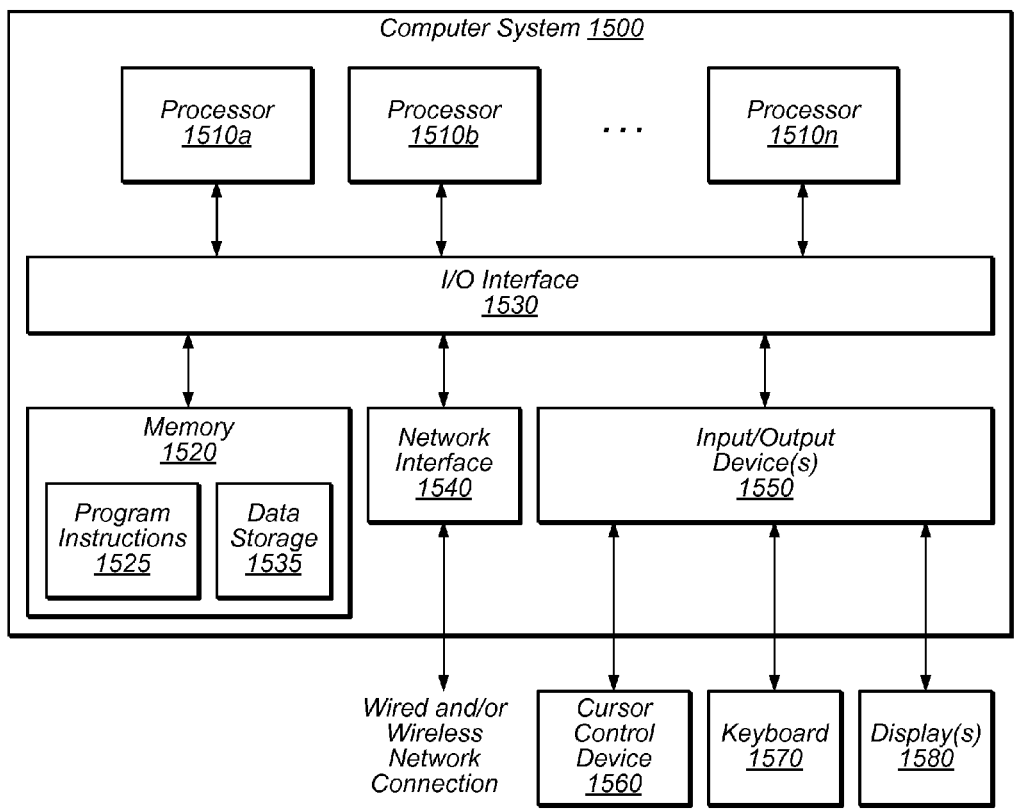
FIG. 9 illustrates an example computer system that may be used in some embodiments of the EAD system.

FIG. 9 illustrates a computer system 1500 that may execute embodiments of an EAD system. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

In one embodiment, the computer system includes one or more processors 1510*a*-1510*n* coupled to a system memory 1520 via an input/output (I/O) interface 1530. The computer system further includes a network interface 1540 coupled to the I/O interface, and one or more input/output devices 1550, such as a cursor control device 1560, a keyboard 1570, and display(s) 1580. In some embodiments, it is contemplated that embodiments may be implemented using a single instance of a computer system, while in other embodiments may be implemented on multiple such systems, or multiple nodes making up a computer system, may be configured to host different portions or instances of embodiments. For example, in one embodiment some elements may be implemented via one or more nodes of the computer system that are distinct from those nodes implementing other elements.

In various embodiments, the computer system may be a uniprocessor system including one processor, or a multiprocessor system including several processors (e.g., two, four, eight, or another suitable number). The processors may be any suitable processor capable of executing instructions. For example, in various embodiments, the processors may be general-purpose or embedded processors implementing any of a variety of instruction set architectures (ISAs), such as the x86, PowerPC, SPARC, or MIPS ISAs, or any other suitable ISA. In multiprocessor systems, each of processors may commonly, but not necessarily, implement the same ISA.

In some embodiments, at least one processor may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host CPU. In various embodiments, the image processing methods disclosed herein may, at least in part, be implemented by program instructions configured for execution on one of, or parallel execution on two or more of, such GPUs. The GPUs may implement one or more application programmer interfaces (APIs) that permit programmers to invoke the functionality of the GPUs. Suitable GPUs may be commercially available from vendors such as NVIDIA Corporation, ATI Technologies (AMD), and others.

System memory within the computer system may be configured to store program instructions 1525 and/or data 1535 accessible by a processor. In various embodiments, the system memory may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an EAD system are shown stored within system memory as program instructions and data storage, respectively. In other embodiments, program instructions and/or data may be received, sent or stored upon different types of computer-accessible media or on similar media separate from system memory or the computer system. Generally, a computer-accessible medium may include storage media or memory media such as magnetic or optical media, e.g., disk or CD/DVD-ROM coupled to the computer system via the I/O interface. Program instructions and data stored via a computer-accessible medium may be transmitted by transmission media or signals such as electrical, electromagnetic, or digital signals, which may be conveyed via a communication medium such as a network and/or a wireless link, such as may be implemented via the network interface.

In one embodiment, the I/O interface may be configured to coordinate I/O traffic between the processor, the system memory, and any peripheral devices in the device, including a network interface or other peripheral interfaces, such as input/output devices. In some embodiments, the I/O interface may perform any necessary protocol, timing or other data transformations to convert data signals from one component into a format suitable for use by another component. In some embodiments, the I/O interface may include support for devices attached through various types of peripheral buses, such as a variant of the Peripheral Component Interconnect (PCI) bus standard or the Universal Serial Bus (USB) standard, for example. In some embodiments, the function of the I/O interface may be split into two or more separate components, such as a north bridge and a south bridge, for example. In addition, in some embodiments some or all of the functionality of the I/O interface, such as an interface to system memory, may be incorporated directly into the processor.

The network interface of the computer system may be configured to allow data to be exchanged between the computer system and other devices attached to a network, such as other computer systems, or between nodes of the computer system. In various embodiments, the network interface may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

The I/O devices may, in some embodiments, include one or more display terminals, keyboards, keypads, touchpads, scanning devices, voice or optical recognition devices, or any other devices suitable for entering or retrieving data by one or more computer systems. Multiple I/O devices may be present in the computer system or may be distributed on various nodes of the computer system. In some embodiments, similar I/O devices may be separate from the computer system and may interact with one or more nodes of the computer system through a wired or wireless connection, such as over the network interface.

The memory within the computer system may include program instructions configured to implement embodiments of an EAD system as described herein. In one embodiment, the program instructions may include software elements of embodiments of the modules discussed earlier in one of the embodiments of the EAD system. The data storage within the computer system may include data that may be used in other embodiments. In these other embodiments, other or different software elements and data may be included.

Those skilled in the art will appreciate that the computer system is merely illustrative and is not intended to limit the scope of the EAD system as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. The computer system may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from the computer system may be transmitted via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally, a computer-accessible medium may include storage media or memory media such as magnetic or optical media such as disks or DVD/CD-ROM, volatile or non-volatile media such as RAM, ROM, flash drives, as well as transmission media or signals such as electrical, electromagnetic, or digital signals, conveyed via a communication medium such as network and/or a wireless link.

The various methods described herein represent example embodiments of methods. These methods may be implemented in software, hardware, or by a combination of hardware and software. The order of the method steps may be changed, and various elements may be added, reordered, combined, omitted, or modified.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
    generating a new row of pixels between an existing upper row of pixels and an existing lower row of pixels within an image, including:
        segmenting the upper and lower row of pixels into one or more segments of pixels, the segmenting comprising identifying pixels of a similar color within the upper and lower row of pixels, each segment including at least a minimum number of pixels from both the upper and lower row of pixels that have a color similarity above a threshold similarity;
        determining whether each of the pixels of the new row is to be included as part of the one or more segments;
        responsive to the determining and for each pixel of the new row that is determined to be part of one of the one or more segments, generating a pixel value for the pixel that is determined to be part of the segment according to a segment interpolation method that uses color values of at least two of the pixels within the segment of pixels; and
        subsequent to generating the pixel value for the pixels of the new row that are determined to be part of the one of more segments:
            for a pixel of the new row that is determined not to be part of the one or more segments, determining an edge within the image at which the pixel of the new row that is determined not to be part of the one or more segments is positioned; and
            generating a pixel value for the pixel that is determined not to be part of the one or more segments according to an edge interpolation method that uses color values of at least two or more pixels of the upper and lower rows that are positioned at the determined edge.

2. The computer-implemented method of claim 1, further comprising generating the pixel value according to the segment interpolation method for each pixel of the new row that is determined to be part of the one or more segments.

3. The computer-implemented method of claim 1, further comprising generating the pixel value according to the edge interpolation method for each pixel of the new row that is determined not to be part of the one or more segments.

4. The computer-implemented method of claim 1, wherein:
the image is an interlaced image; and
generating the new row of pixels is repeated for each successive pair of existing rows of pixels of the interlaced image to deinterlace the interlaced image.

5. The computer-implemented method of claim 1, wherein said identifying pixels of a similar color comprises calculating a color distance between a running average of pixel colors within the segment of pixels and pixel color of a pixel of the upper or lower row being considered for inclusion within the segment of pixels.

6. The computer-implemented method of claim 1, wherein the segment interpolation method comprises:
selecting one or more pixels from the upper row of pixels within the segment;
selecting one or more pixels from the lower row of pixels within the segment;
calculating an interpolation value for the pixel that is determined to be part of the segment based on the one or more pixels in the upper row of pixels and the one or more pixels in the lower row of pixels.

7. The computer-implemented method of claim 1, wherein the determining the edge within the image comprises:
calculating an energy function value for each one of a plurality of potential edges; and
selecting as the edge one of the plurality of potential edges that has a minimum energy function value of energy function values calculated.

8. The computer-implemented method of claim 7, wherein:
one energy function value for one of the plurality of potential edges is calculated according to a horizontal energy function; and
the horizontal energy function value is based on a color distance between pixels in the upper and lower rows to the left and pixels in the upper and lower rows to the right of the pixel that is determined not to be part of the one or more segments.

9. The computer-implemented method of claim 7, wherein at least some of the energy function values for the plurality of potential edges are calculated according to an edge energy function based on a color distance between pixels of the upper and lower row along the potential edge, a color distance between pixels of the upper and lower row along an opposite edge, and a vertical gradient of the potential edge.

10. The computer-implemented method of claim 9, wherein one of:
the edge interpolation method is based on a horizontal edge interpolation method if the minimum energy function value is equal to the horizontal energy function value; or
the edge interpolation method is based on a non-horizontal edge interpolation method if the minimum energy function value is not equal to the horizontal energy function value.

11. The computer-implemented method of claim 9, wherein:
the horizontal edge interpolation method is based on a pixel value for a pixel directly above the pixel that is determined not to be part of the one or more segments and a pixel directly below the pixel that is determined not to be part of the one or more segments; and
the non-horizontal edge interpolation method is based on a pixel value for a pixel in the upper row along the edge and a pixel from the lower row along the edge.

12. A system, comprising:
at least one processor; and
a memory comprising program instructions, wherein the program instructions are executable by the at least one processor to perform operations comprising:
generating a new row of pixels between an existing upper row of pixels and an existing lower row of pixels within an image, including:
segmenting the upper and lower row of pixels into one or more segments of pixels, the segmenting comprising identifying pixels of a similar color within the upper and lower row of pixels, each segment including at least a minimum number of pixels that have a color similarity above a threshold similarity;
for each pixel of the new row that is determined to be part of one of the one or more segments and prior to generating a pixel value for any pixel of the new row that is determined not to be part of the one or more segments, generating a pixel value for the pixel that is determined to be part of the segment according to a segment interpolation method that uses color values of at least two of the pixels within the segment of pixels;
for a pixel of the new row that is determined not to be part of the one or more segments, determining an edge within the image at which the pixel of the new row that is determined not to be part of the one or more segments is positioned; and
generating the pixel value for the pixel that is determined not to be part of the one or more segments according to an edge interpolation method that uses color values of at least two or more pixels of the upper and lower rows that are positioned at the determined edge.

13. The system of claim 12, wherein the operations further comprise generating the pixel value according to the segment interpolation method for each pixel of the new row that is determined to be part of the one or more segments.

14. The system of claim 12, wherein the operations further comprise generating the pixel value according to the edge interpolation method for each pixel of the new row that is determined not to be part of the one or more segments.

15. The system of claim 12, wherein:
the image is an interlaced image; and
generating the new row of pixels is repeated for each successive pair of existing rows of pixels of the interlaced image to deinterlace the interlaced image.

16. A computer-readable memory storing program instructions that are executable by a computing device to perform operations comprising:
generating a new row of pixels between an existing upper row of pixels and an existing lower row of pixels within an image, including:
segmenting the upper and lower row of pixels into one or more segments of pixels, the segmenting comprising identifying pixels of a similar color within the upper and lower row of pixels, each segment including at least a minimum number of pixels from both the upper and lower row of pixels that have a color similarity above a threshold similarity;

for each pixel of the new row that is determined to be part of one of the one or more segments and prior to generating a pixel value for any pixel of the new row that is determined not to be part of the one or more segments, generating a pixel value for the pixel that is determined to be part of the segment according to a segment interpolation method that uses color values of at least two of the pixels within the segment of pixels;

for a pixel of the new row that is determined not to be part of the one or more segments, determining an edge within the image at which the pixel of the new row that is determined not to be part of the one or more segments is positioned; and generating the pixel value for the pixel that is determined not to be part of the one or more segments according to an edge interpolation method that uses color values of at least two or more pixels of the upper and lower rows that are positioned at the determined edge.

17. The computer-readable memory of claim 16, wherein the operations further comprise generating the pixel value according to the segment interpolation method for each pixel of the new row that is determined to be part of the one or more segments.

18. The computer-readable memory of claim 16, wherein the operations further comprise generating the pixel value according to the edge interpolation method for each pixel of the new row that is determined not to be part of the one or more segments.

19. The computer-readable memory of claim 16, wherein:
the image is an interlaced image; and
generating the new row of pixels is repeated for each successive pair of existing rows of pixels of the interlaced image to deinterlace the interlaced image.

20. The computer-readable memory of claim 16, wherein said identifying pixels of a similar color comprises calculating a color distance between a running average of pixel colors within the segment of pixels and pixel color of a pixel of the upper or lower row being considered for inclusion within the segment of pixels.

* * * * *